A. H. SHEFFER.
Harrow and Cultivator.
No. 54,421.
Patented May 1, 1866.
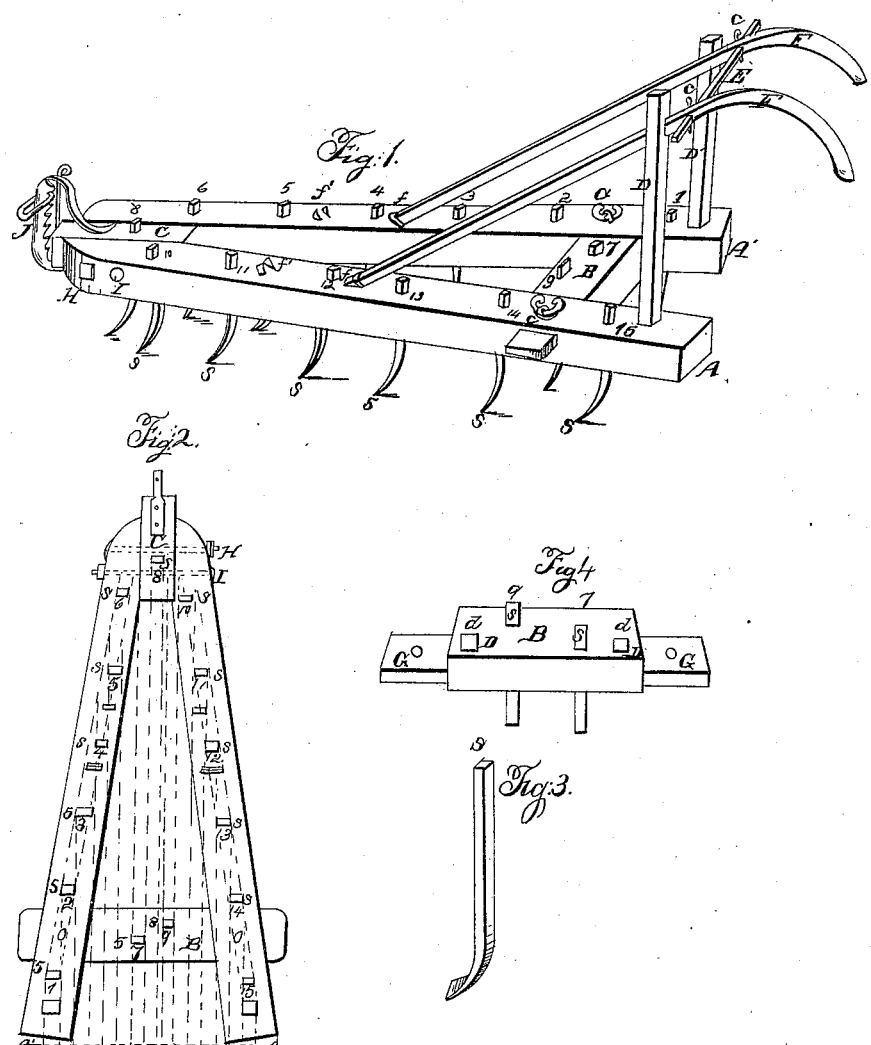

UNITED STATES PATENT OFFICE.

A. H. SHEFFER, OF WEST DONEGAL TOWNSHIP, LANCASTER COUNTY, PENNSYLVANIA.

IMPROVEMENT IN HARROW AND CULTIVATOR COMBINED.

Specification forming part of Letters Patent No. 54,421, dated May 1, 1866.

*To all whom it may concern:*

Be it known that I, ABRAHAM H. SHEFFER, of West Donegal township, in the county of Lancaster and State of Pennsylvania, have invented a new and Improved Harrow-Cultivator; and I do hereby declare that the following is a full and exact description of the construction and operation of the same, reference being had to the accompanying drawings, making a part of this specification, in which—

Figure 1 is a perspective view; Fig. 2, a plan view and illustration of the arrangement and traverse of the flattened spikes. Fig. 3 shows one of the fifteen flattened spikes used, bent at the point with a sharp and straight cutting-edge. Fig. 4 shows an extra rear cross-piece, which may be inserted for widening the harrow for certain uses.

The object of my invention is to cultivate the soil so as to avoid the ridges left by the use of the broader and pointed shovels now in use, and more thoroughly pulverize every clod, planing, as it were, by the arrangement of the narrow straight cutting-edges of my spikes, and effectually to remove every vestige of weeds and grass. The common pointed and square-toothed harrows fail to perform this office effectually.

To accomplish this I construct my harrow much like an ordinary cultivator, arranging the cutting-spikes, Fig. 3, in the two arms or beams A A', cross-piece B in the rear, and front portion, C, in the manner shown and illustrated by Nos. 1 to 15, effectually crossing or cutting every portion of the soil with which they come in contact.

The handles F and supports D are made to shift. The handle cross-stay E is adjustable by means of pins $e$ and holes. The cheeks or side beams, A A', and front central piece, C, are held by two bolts, H I, with screw and burr for adjustment. J, the clevis; $f'$ $f'$, staples for the ends of the handles F when widened by introducing the extra rear cross-piece, B, Fig. 4, which latter has also two spikes, 7 9, and holes $d$ for the reception of the handle-supports D. There are also headed bolts or binding-screws G for securing said extra piece, as also the cross-piece shown in Fig. 1.

The drawings, Figs. 1 and 2, clearly show the construction and plan of insertion of my cutting-spikes, so that any mechanic can readily make this agricultural implement, which, by actual trial, has proved to surpass any implement with which myself or neighbors have yet become acquainted, and is one highly desirable on every farm, notwithstanding the numerous inventions now in use, not one of which is adapted to give the satisfaction this implement does.

I am aware at first sight, or when superficially examined, it may not strike the beholder as any thing novel, or even an improvement over others. A fair trial, however, has decided the one, as a close inspection of its construction and arrangement will no doubt be freely admitted for the other.

I also contemplate to adapt a pair of V scrapers to the rear cross-piece, B, so as to have in the one implement not only an improved harrow for preparing the soil in a superior manner, but also a cultivator for dressing corn-lands and the like in all its stages.

What I claim as my invention, and desire to secure by Letters Patent, is—

The specific combination of the adjustable handles F on the side pieces, A, also made adjustable at the apex by bolts H I and central jaw-piece only, together with the arrangement of the curved flat and narrow shares or spikes S, inserted and operating in the manner shown, and for the purpose specified.

A. H. SHEFFER.

Witnesses:
H. M. BRENEMAN,
J. L. GOOD.